United States Patent

Bandimere

[15] 3,640,129
[45] Feb. 8, 1972

[54] VALVE SPRING TESTER

[72] Inventor: John C. Bandimere, 3740 Fenton St., Wheatridge, Colo. 80033

[22] Filed: Sept. 5, 1969

[21] Appl. No.: 855,653

[52] U.S. Cl. ............................................. 73/119 R, 73/161
[51] Int. Cl. .................................... G01m 13/00, G01l 1/04
[58] Field of Search ..................... 73/161, 94, 139, 118, 119; 123/90.65

[56] References Cited

UNITED STATES PATENTS 2,518,408  8/1950  Weyand ..................................... 73/94

Primary Examiner—Louis R. Prince
Assistant Examiner—Denis E. Corr
Attorney—Sheridan, Ross and Burton

[57] ABSTRACT

Valve spring tester and method for testing the strength of valve springs in situ on valve-in-head engines, the valves of which are operated by rocker arms, characterized by a lever tool affixed to a torque wrench. The tool may be readily secured directly to a rocker arm for rotating same and compressing its associated spring to desired length at which the torque wrench provides a reading which is a measure of the spring strength or force at the particular length to which it has been compressed.

9 Claims, 4 Drawing Figures

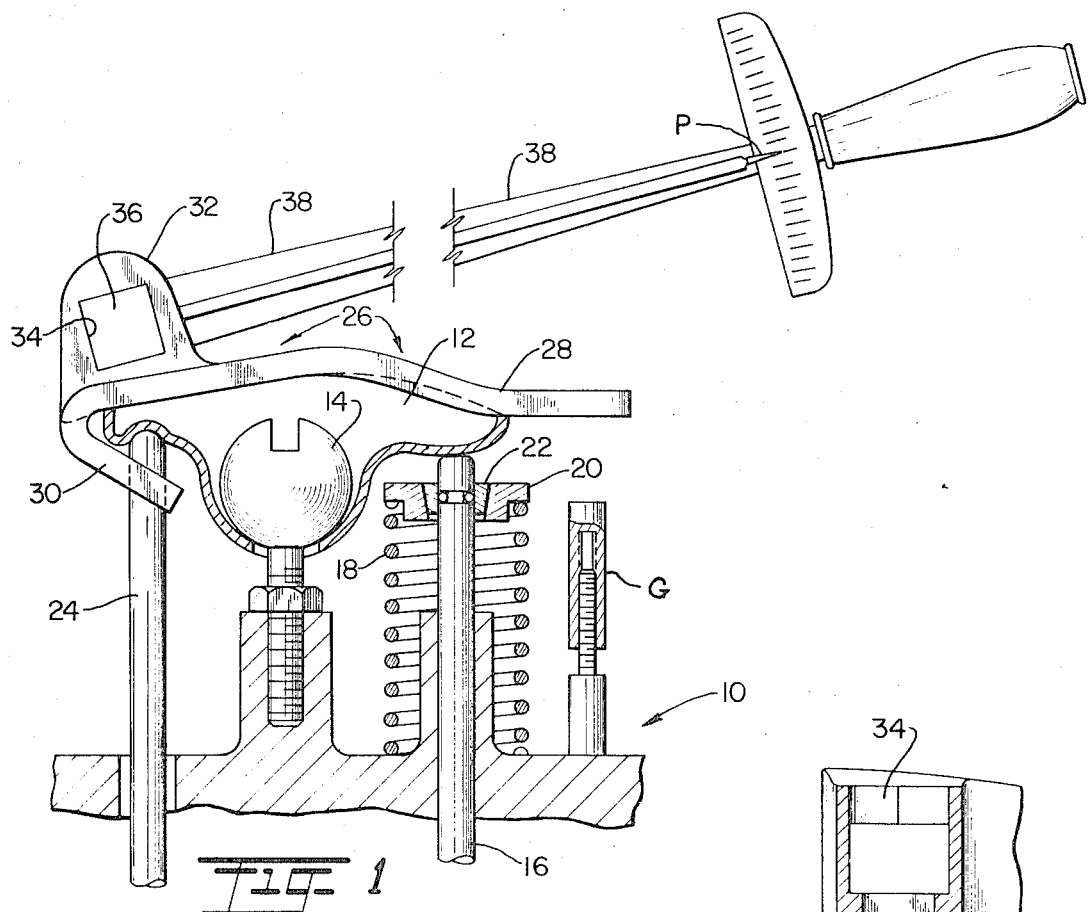
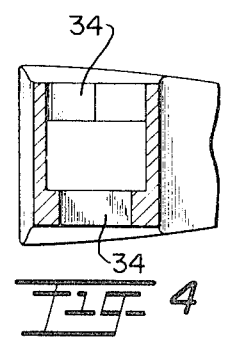
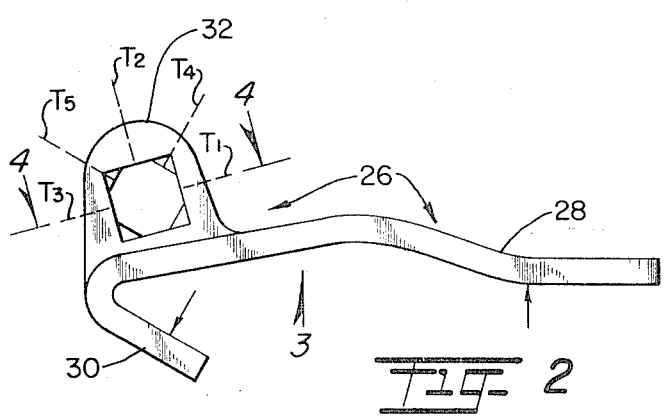
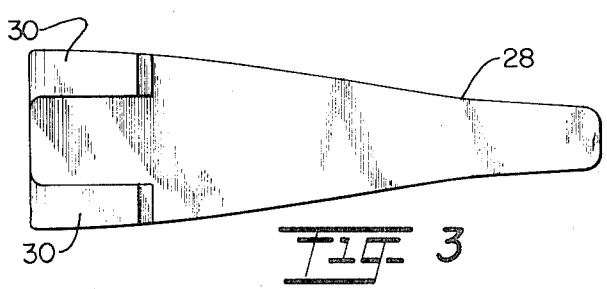
INVENTOR
JOHN C. BANDIMERE
BY
Sheridan, Ross & Burton
ATTORNEYS

VALVE SPRING TESTER

BACKGROUND OF THE INVENTION

In the maintenance and repair of automotive vehicle engines it has long been the practice to test the strength of valve springs to ensure that they have not weakened through fatigue and hence may cause faulty engine operation, particularly at high speeds where valves may float, that is, not completely close as intended. When the valve action is dismantled during replacement or resurfacing of same the springs are usually tested on a bench testing device which measures the spring pressure at a predetermined length of compression of same and if they fail to meet required test tolerance they are usually replaced with new springs. U.S. Pat. No. 2,340,277 to Sturtevant is exemplary of such type of testing device. It is sometimes desired to test the springs in situ, that is, without dismantling the valve action and various testing devices have been proposed for this purpose. U.S. Pat. No. 1,822,587 to Essen is exemplary of such type of device for us on L-head engines, that is, where the valves are disposed in the cylinder block. The L-head engine has, however, been largely superseded by the valve-in-head engine and hence an in situ tester for an L-head engine is not properly designed for an engine where the valves are disposed in the cylinder head and operated by rocker arms and push rods or directly by an overhead camshaft. U.S. Pat. No. 2,518,408 to Weyand is illustrative of a tester of the latter type which employs a conventional torque wrench for measuring spring pressure at a predetermined length of compression, this device serving the same general purpose of this invention but requiring a complicated linkage system which must be secured to the cylinder head, many of which are not provided with cylinder head cover studs or the like for securing such a device to the cylinder head.

SUMMARY OF THE INVENTION

The present invention utilizes a torque wrench, as in the Weyand patent referred to, but requires only a simple and inexpensive leverage tool which may be secured directly to a rocker arm for compressing a valve spring to a desired length. No clamping structure to the cylinder head is required and the torque wrench its attached leverage tool may be quickly applied to a rocker arm and shifted to the next as the springs are successively tested.

The principal objective of the invention is, accordingly, the provision of a leverage tool which may be attached to a conventional torque wrench, the combination of which form a spring tester which may compress a spring to desired length, the torque wrench reading being a measure of the spring pressure, the combination further forming a device which may be attached to a rocker arm without use of tools and irrespective of the presence or absence of means for securing same to the cylinder head.

Further objects, advantages and salient features will become more apparent from the detailed description to follow, the appended claims and the accompanying drawing to now be briefly described.

BRIEF DESCRIPTION OF THE DRAWING

FIG. 1 is a cross section through a portion of a valve-in-head engine, illustrating a tool and torque wrench attached to a rocker arm;

FIG. 2 is a side elevation of the tool of FIG. 1;

FIG. 3 is a lower plan as viewed in the direction of arrow 3, FIG. 2; and

FIG. 4 is a section taken through line 4—4, FIG. 2.

DESCRIPTION OF PREFERRED EMBODIMENTS

Referring now to the drawing, FIG. 1 depicts one form of valve-in-head construction 10 including a rocker arm 12 pivotally connected to the cylinder head by an adjustable spherical screw 14, valve stem 16, which carries a valve head (not shown), being urged toward its closed position by a compression spring 18, disposed between the cylinder head and a cup washer 20 locked to the free end of the valve stem by a split tapered lock 22. One end of the rocker arm engages the free end of the valve stem and its other end is actuated by a push rod 24, operated by a camshaft (not shown) the construction so far described being conventional and substantially and substantially standard construction on present valve-in-head engines. There are, however, many variations in rocker arm design. For example, a fixed rocker arm shaft may support the rocker arm and a suitable adjusting screw may be carried by the rocker arm, usually on the end which engages the push rod, for adjusting the valve stem clearance when the valve head is closed or in contact with its seat. Some overhead cam engines are of like construction, employing pivoted rocker arms but no push rod is employed, a cam lobe directly engaging the rocker arm. It will thus be understood that the illustration is exemplary, only, of a valve-in-head engine, the valves of which are opened by pivoted rocker arms, and closed by compression springs and the manner of opening same, whether it be by push rod or overhead cam is immaterial, the testing of the spring being the same in either construction.

The subject of the invention comprises a tool 26 which may be attached to the rocker arm in any suitable manner for rotating it and compressing spring 18. In the form illustrated, this comprises an arm 28 having a pair of hooks 30, 30 at one end which straddle the push rod and engage the rocker arm at one end of same, any suitable portion of arm 28 engaging the upper surface of the rocker arm. In essence, therefore, arm 28 is in the nature of a lever or wrench which may be quickly and manually attached to a rocker arm for applying a torque to same and manually compressing spring 18 to a desired length.

Since considerable leverage is required to compress the spring, and since it is desired to employ a conventional torque wrench which forms a part of the handtool equipment of most engine mechanics, a suitable boss or lug 32 is formed on tool 26 which is provided with square apertures 34, 34 which may detachably receive a like driving end 36 on a torque wrench 38. Apertures 34 preferably extend through the lug so that the torque wrench may be affixed to either side of the tool and, if desired, the square apertures or sockets at each end of the lug may be indexed relatively by 45° to thereby increase the number of positions of affixation of the torque wrench relative to the tool. This is illustrated in FIG. 2 wherein square end 36 of the torque wrench may be affixed to one side of lug 32 in positions, T1, T2 and T3 and to the other side of same in positions T4 and T5. Normally, other positions will not be possible due to interference of the torque wrench with parts of the engine.

Any suitable gage G may be employed to measure the length of the spring when compressed to a predetermined length and at which the reading of pointer P on the torque wrench is observed and, as will be apparent, the gage may be constructed adjustable in length if so desired.

In the operation of the invention the tool is affixed to the torque wrench and hooks 30 disposed beneath one end of the rocker arm as shown in FIG. 1. The valve spring is then compressed to a predetermined length by the torque wrench and the torque wrench reading is observed. Since torque wrench dials are usually calibrated in foot-pounds (or inch-pounds) this reading is a measure of the spring force and if the spring is compressed to a predetermined length its force or strength thereat is translated into foot-pounds or the like. A suitable chart or other data may be provided to correlate the two variables referred to or alternatively the data may be empirically established by comparison with a new spring which has a correct and known spring constant.

While hooks 40 have been illustrated for attaching tool 26 to the rocker arm it will be understood that these are exemplary, only, and various other structures may be employed, the essential feature being that a rapid direct attachment between a torque wrench and a rocker arm may be made so that the torque wrench may compress the valve spring to a desired length and determine whether its force or strength at such length conforms to a known tolerance.

It is to be understood that this invention is not limited to the exact embodiments of the device shown and described, which are merely by way of illustration.

I claim:

1. Apparatus for testing a valve spring in situ on a valve-in-head engine having a rocker arm pivoted about an axis and associated with such spring, comprising:
   a. a tool adapted to be detachably and contiguously connected with the rocker arm.
   b. said tool having spaced portions for abutting spaced portions on the rocker arm for capturing it and for bodily rotating it with the tool and compressing the spring, and
   c. means affixed directly to said tool for securing it to the driving end of a torque wrench.

2. Apparatus in accordance with claim 1 wherein said means comprises a square socket for receiving the square driving end of a torque wrench.

3. Apparatus in accordance with claim 2 including two square sockets, one at each side of the tool, for receiving the square driving end of the torque wrench.

4. Apparatus in accordance with claim 3 wherein the square sockets are angularly indexed relative to each other to increase the possible angular positions of the torque wrench relative to the member.

5. Apparatus in accordance with claim 1 wherein said tool is provided with a pair of hooks which straddle a rocker arm push rod and engage the rocker arm adjacent thereto.

6. Apparatus in accordance with claim 1 including a torque wrench secured to said means on said tool.

7. Apparatus in accordance with claim 6 wherein the torque wrench is detachably secured, to thereby permit the use of a conventional torque wrench.

8. Apparatus in accordance with claim 1 wherein the rocker arm is of the type adapted to be actuated by a push rod.

9. Apparatus in accordance with claim 1 wherein said portions on the rocker arm are disposed on opposite sides of the Pivotal axis thereof.

* * * * *